United States Patent [19]
Cronch et al.

[11] Patent Number: 5,237,464
[45] Date of Patent: Aug. 17, 1993

[54] DIFFERENTIAL SLIMMER

[75] Inventors: Robert D. Cronch; Dennis D. Duffy, both of Oklahoma City, Okla.

[73] Assignee: Seagate Technology, Inc., Scotts Valley, Calif.

[21] Appl. No.: 942,107

[22] Filed: Sep. 8, 1992

Related U.S. Application Data

[63] Continuation of Ser. No. 516,307, Apr. 30, 1990, abandoned.

[51] Int. Cl.⁵ .............................................. G11B 5/09
[52] U.S. Cl. ........................................ 360/46; 360/65
[58] Field of Search ........................................... 360/46

[56] References Cited

U.S. PATENT DOCUMENTS

| | | | |
|---|---|---|---|
| 3,821,797 | 6/1974 | Suzuki et al. | 360/24 |
| 3,864,734 | 2/1975 | Grish | 360/46 |
| 4,346,412 | 8/1982 | Conley | 360/46 |
| 4,370,681 | 1/1983 | Akagiri | 360/68 |
| 4,371,900 | 2/1983 | Huber | 360/40 |
| 4,498,111 | 2/1985 | Rijckaert | 360/27 |
| 4,517,612 | 5/1985 | Rijckaert | 360/67 |
| 4,562,492 | 12/1985 | Higurashi | 360/65 |
| 4,564,869 | 1/1986 | Baumeister | 360/46 |
| 4,760,472 | 7/1988 | Minuhin et al. | 360/46 |
| 4,801,827 | 1/1989 | Metz | 307/602 |
| 4,853,802 | 8/1989 | Kukson et al. | 360/65 |
| 4,984,102 | 1/1991 | Fujimoro | 360/65 |

*Primary Examiner*—Vincent P. Canney
*Attorney, Agent, or Firm*—Flehr, Hohbach, Test, Albritton & Herbert

[57] ABSTRACT

A circuit for slimming signals read signals from a read/write head of a rotating disk data storage device. A low-pass filter and a high-pass filter are connected in parallel to the read signal from the read/write head. These filters each have a variable gain amplifier connected to their respective output ports. The gain of each of the variable gain amplifiers is programmably adjusted in accordance with preselected criteria. A summing circuit is connected to the outputs of the variable gain amplifiers to generate a slimmed read signal. A multi-pole low pass filter has an input port coupled to the output port of the summing circuit.

38 Claims, 8 Drawing Sheets

DIFFERENTIAL SLIMMER

This is a continuation of application Ser. No. 07/516,307 filed Apr. 30, 1990 now abandoned.

BACKGROUND OF THE INVENTION

1. Field of the Invention

This invention relates to circuits for signal processing signals from read/write heads in magnetic disk storage systems and, more particularly, to read pulse slimming circuits.

2. Prior Art

Previously, pulse slimming, or sharpening, of read signals from a read/write head of a magnetic disk recording system was accomplished using delay lines to provide a raised cosine response for the read signals from the read/write head. It is desirable that the delay lines be eliminated and pulse slimming be accomplished using circuits which are produced, using more cost effective integrated circuits technology. To reduce noise and interference pickup, it is desirable to use balanced, differential circuit configurations for pulse slimming circuits.

SUMMARY OF THE INVENTION

It is an object of the invention to provide an adjustable pulse-slimming circuit for processing read signals from the read/write head of a magnetic disk recording system.

It is another object of the invention to provide a differential, balanced pulse slimming circuit for processing a read signal in a magnetic disk recording system to reduce noise and interference pickup.

It is another object of the invention to provide a programmably adjustable pulse-slimming circuit which is adjusted to accommodate the read-pulse characteristics of various zones on a magnetic disk and to optimize pulse-slimming for read signals from the various zones.

In accordance with these and other objects of the invention, a circuit for slimming read signals received from a read/write head of a rotating disk data storage device is provided. A first low-pass filter is connected to receive the read signal from the read/write head. A high-pass filter is connected to the read/write head for receiving the read signal. A first variable gain amplifier is connected to the output of the low pass filter; and a second variable gain amplifier is connected to the output of the high pass filter. Means are provided for selectively adjusting the gain of each of the variable gain amplifiers in accordance with preselected criteria. A summing circuit is connected to the output ports of the variable gain amplifiers to generate a slimmed signal from the amplified components of the read signal received from the read/write head.

The pulse-slimming circuit further includes a second low-pass filter, which is a multi-pole filter. This filter has an input port coupled to the output port of the summing circuit to receive the slimmed signal from the output port of the summing circuit.

The pulse-slimming circuit further includes a differentiator circuit having an input port coupled to the output port of the multi-pole low pass filter. The differentiator circuit has an output port at which is provided a differentiated output signal for the multi-pole low pass filter.

A method is provided for slimming signals received from a read/write head of a rotating disk data storage device. The method includes the steps of filtering the signal into high and low frequency components; amplifying each component by an amount selected in accordance with a preselected criterion; and adding the amplifier components.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE PREFERRED EMBODIMENTS

Reference will now be made in detail to the preferred embodiments of the invention, examples of which are illustrated in the accompanying drawings. While the invention will be described in conjunction with the preferred embodiments, it will be understood that they are not intended to limit the invention to those embodiments. On the contrary, the invention is intended to cover alternatives, modifications and equivalents, which may be included within the spirit and scope of the invention as defined by the appended claims.

One of the primary goals of the present invention is to facilitate production of a sharp positive-going edge each time that a reversal in magnetic flux occurs on a magnetic data storage disk as the disk is rotated past a read/write head. The pulse edge is to be centered on the peak of the corresponding emf pulse generated in the read/write head by the passage of the head over the magnetic recording media.

Figure 1:
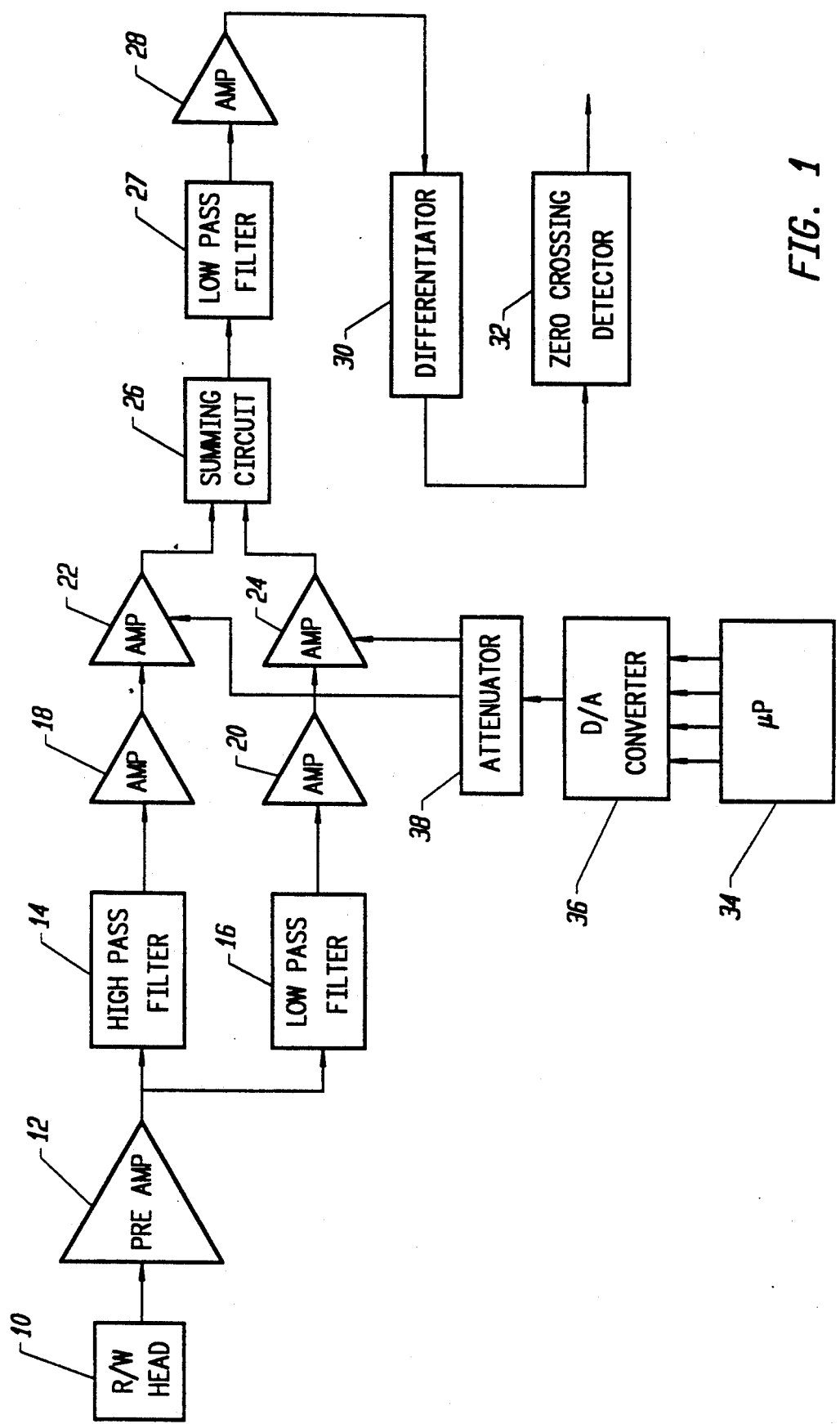
FIG. 1 is block diagram of a single-ended, unbalanced embodiment of a slimming circuit for slimming signals obtained from a read/write head of a magnetic disk storage device.

FIG. 1 shows a circuit, according to the invention, for accomplishing this. The read/write head 10 generates a read pulse signal. The read pulse signal is first amplified in a preamplifier 12 and then passed in parallel through both a high-pass filter 14 and a low-pass filter 16. After additional amplification in first-stage amplifiers, the respective filtered signals are each separately amplified by adjustable gain amplifiers 22 and 24. The output signals of these amplifiers 22,24 are then summed in a summing circuit, or mixer, 26. The pulse at the output terminal, or port, of the summing circuit 26 has a frequency spectrum which has been modified from that of the original read signal from the read/write head. The output pulse of the summing circuit 26 is passed through a second low-pass filter 27, which has a frequency range that overlaps the frequency range of the high-pass filter 14. The pulse is additionally amplified by amplifier 28 and then differentiated by a differentiator circuit 30. The output signal of the differentiator is then passed through a zero-crossing detector 32 to provide the desired positive-going edge, corresponding to a magnetic flux reversal on the storage disk.

Note that the original read pulse signal is shaped by separating it into a high-frequency portion and a low-frequency portion. Each of these portions is separately amplified in the variable gain amplifiers and then combined in the summer circuit to regenerate a modified, slimmed pulse. Selection of the amount of amplification for each of the variable-gain amplifiers is accomplished by providing control signals to control terminals for the variable-gain amplifiers.

The control signals are provided, for example, as one of 16 levels from binary-coded information provided by a microprocessor 34 and converted in a digital-to-analog converter 36. An attenuator 38 provides suitable control signal levels for the variable-gain amplifiers 22,24.

Selection of appropriate control signal levels is accomplished as follows:

First, it is recognized that the shape of any pulse generated in the read/write R/W head depends upon the distance between the R/W head and the radial position of the head with respect to the center of the rotating disk. The relative linear speed of the disk with respect to the R/W head effects the read signal in two ways. One way is that the R/W head flies over the surface of the disk on a film of air which turns with the disk. Variations in the linear speed of the disk results in variations in the force provided by the moving air to maintain the R/W head above the disk. As a result, the height of the head above the disk surface varies with the radial position of the R/W head. Consequently, variations in the magnetic flux intercepted by the head at different radial positions are produced, to effect the shape of the read pulses.

Secondly, since the emf induced in the head is related to the time rate of change of magnetic flux, variations in the speed of the disk with respect to the head also effects the shape of the read pulse.

Consequently, the pulse shaping that needs to be done is related to the radial position of the R/W head.

Pulse shaping is accomplished by dividing the magnetic disk into zones. For each zone, read pulses are generated by the R/W head and fed through the slimmer circuit. The waveforms of the output pulses of the slimmer circuit are observed for various combinations of levels of amplification through the amplifiers 22,24, as controlled by the D?A converter 36 and the attenuator 38. The signal levels which provide the best output pulse shape are determined for the reconstructed read signals at the output of the summer circuit 26. The microprocessor 34 is then programmed to provide the corresponding appropriate level of amplification for the amplifiers 22,24 whenever magnetic data on a particular track within a given zone is to be read.

Figure 2:
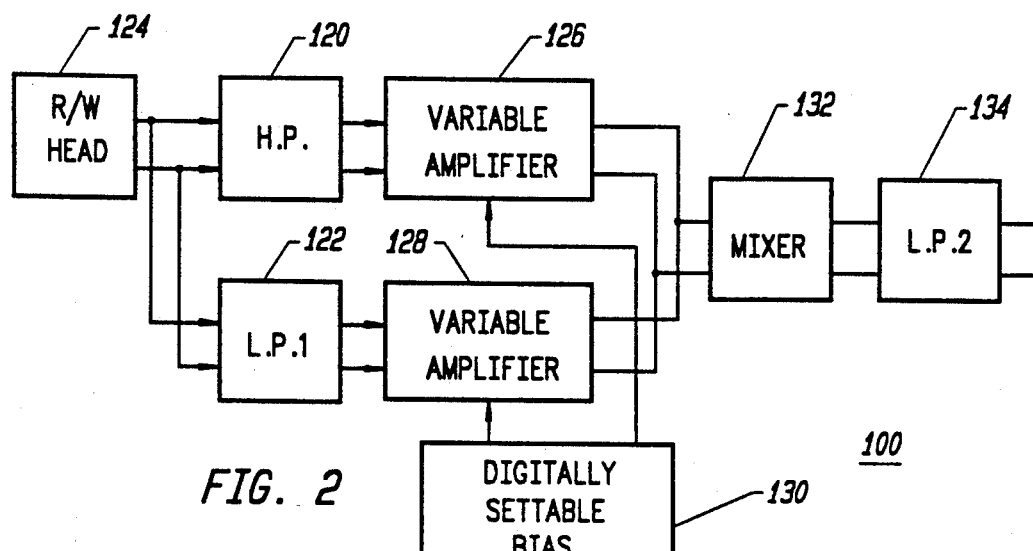
FIG. 2 is a block diagram of a differential-circuit, balanced embodiment of a slimming circuit for slimming signals obtained from a read/write head of a magnetic disk storage device, wherein the slimming circuit utilizes balanced, differential circuits.

FIG. 2 shows a slimming circuit 100 which operates in a differential, balanced mode to minimize noise pickup. The circuit includes parallelled high and low pass filters 120,122 that receive pulses from the read/write head 124 of the disk storage device and, after filtering, pass the pulses to variable-gain, differential filters 126 and 128. The gains of each of the filters 126 and 128 is controlled on a zone basis by a four-bit digital number supplied to a digitally settable bias circuit 130 from a system microprocessor (similar to the microprocessor 34 of FIG. 1). These digital numbers are found experimentally by observing single read pulses that have passed through the entire circuit for each of the sixteen possible values and choosing the value which gives an optimally shaped pulse. The digital numbers are then stored in the microprocessor system on a zone-by-zone basis and the amplifier gains adjusted accordingly whenever a track in a particular zone is read. The outputs of the amplifiers are combined in a mixer 132 and the combined output of the mixer is passed through a 7-pole, low pass filter 134, which provides a sharp high frequency cutoff.

Figure 3:
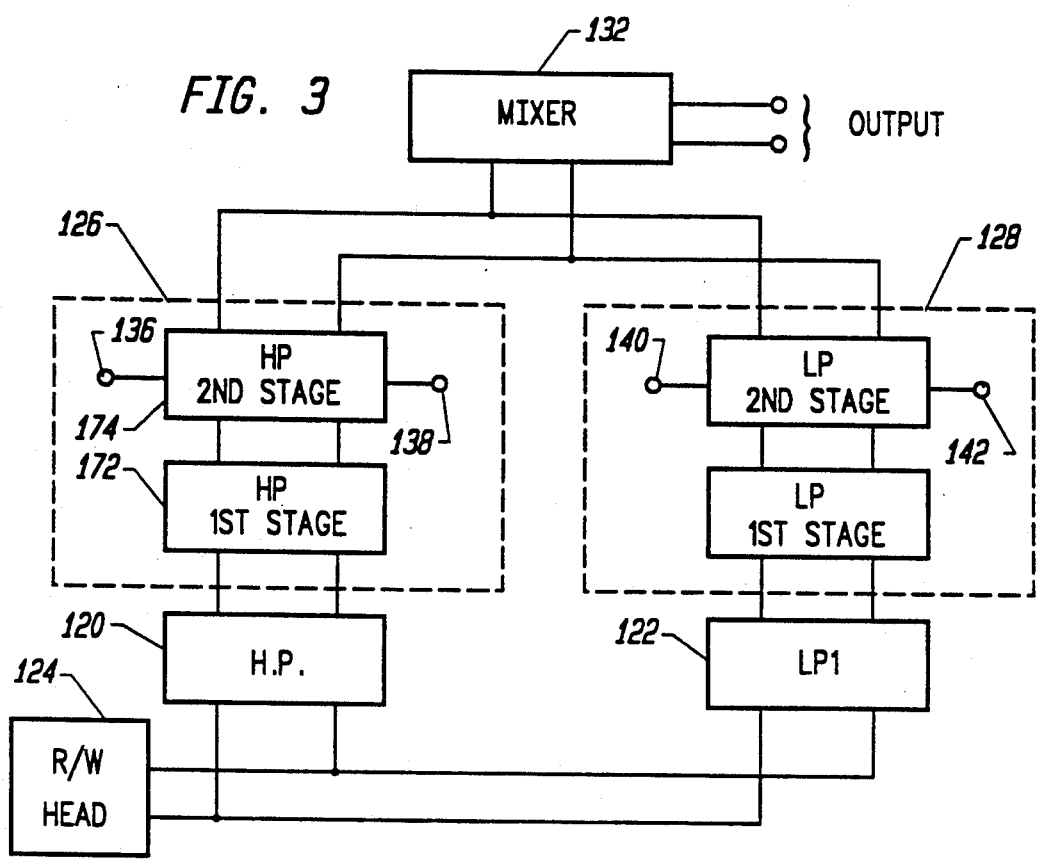
FIG. 3 is a block diagram showing the layout of the differential-circuit embodiment of FIG. 2.

FIG. 3 shows the general layout, for example of a printed circuit board, of the amplifying stages and their connection and relationship to various other circuit elements, including the read/write R/W head 124. As shown therein, the amplifier 126 has gain-control input terminal 136,138. The amplifier 126 also has a fixed gain first stage 172 that receives the output of the high-pass HP filter 120. A variable-gain second stage 174, which has the gain-control terminals 136,138, receives the output signals from the first stage 172 and drives the mixer 132. The amplifier 128 for the low-pass filter LP1 122 has gain control terminals 140,142 and is substantially identical to the amplifier 120. As indicated by the pairs of signal lines between the various elements illustrated, the first and second stages of both amplifiers are differential amplifiers, as shown in more detail in FIGS. 4 and 5 below.

Figure 4:
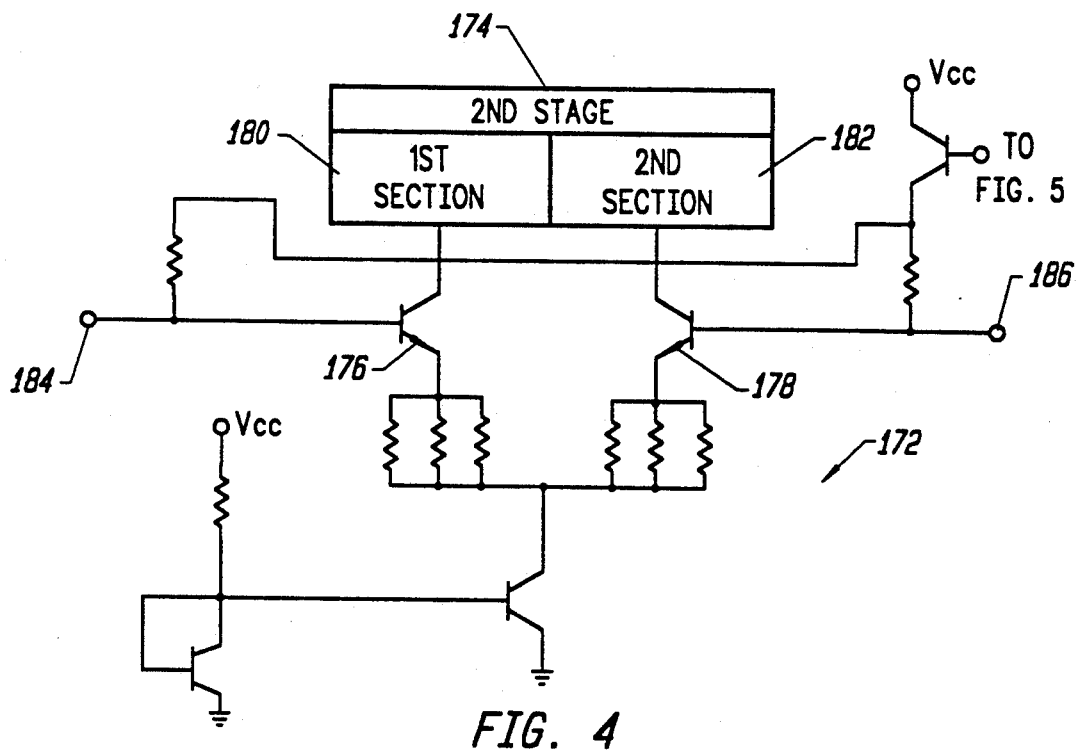
FIG. 4 is a circuit diagram of the first stage of a differential-circuit variable amplifier following a low-pass or a high-pass filter network of FIG. 2.

FIG. 4 is a circuit diagram of the first stage 172 of the amplifier 126. The first stage 172 is a differential amplifier having a differential pair of transistors 176 and 178 operating in a common emitter configuration. Note that the first section 180 and the second section 182 of the second stage 174 each provide a respective load for corresponding sections 176,178 of the first stage 172. The signal from the high-pass filter 120 is received on input terminals 184,186.

Figure 5:
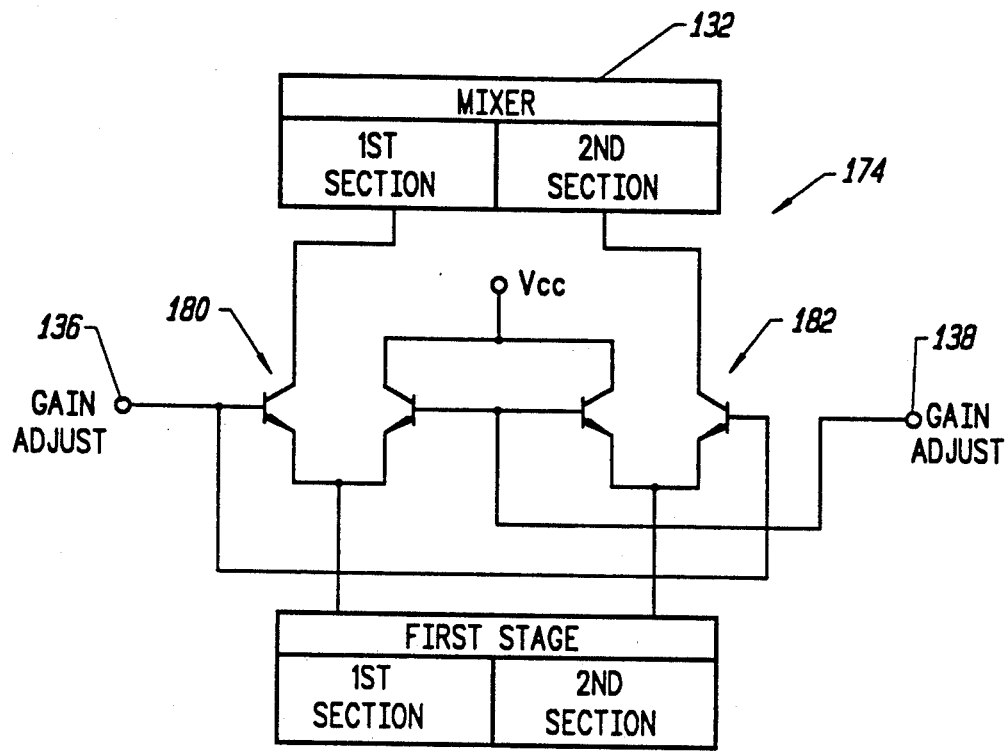
FIG. 5 is a circuit diagram of the second stage of a differential-circuit variable amplifier of FIG. 2.

FIG. 5 is a circuit diagram of the second stage 174 of the amplifier 126. Each section 180,182 of the second stage is a differential amplifier comprised of two transistors in a common base configuration. Signals from each transistor 176,178 of the first stage are received at the emitters of the common base transistors. The gains of the first and the second sections, which form a "super" differential amplifier, are adjusted by bias currents applied at the gain control terminals 136 and 138. The mixer 132 has two sections, which serve as respective loads for one of the transistors in each of the differential amplifiers pairs 180,182.

Figure 6:
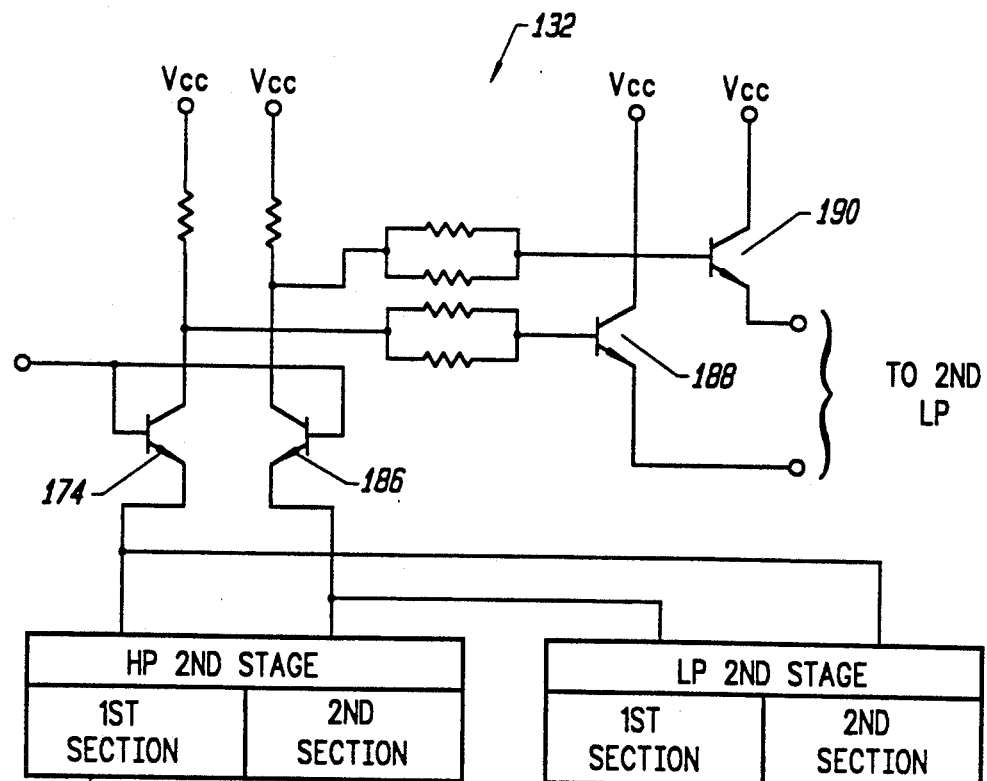
FIG. 6 is a circuit diagram of a summer or mixer stage of the differential-circuit variable amplifier of FIG. 2.

FIG. 6 is a circuit diagram for the mixer 132. The mixer circuit, or summer circuit, comprises a differential amplifier made up of transistors 184 and 186 in a common base configuration. Signals from both of the second stage amplifiers of amplifiers 126,128 are fed to the emitters of the transistors 174,176, as shown. The output signals of the differential amplifier is transmitted to a pair of transistors 188 and 190 which are emitter followers, with the multi-pole low-pass filter 134 as a load.

Figure 7:
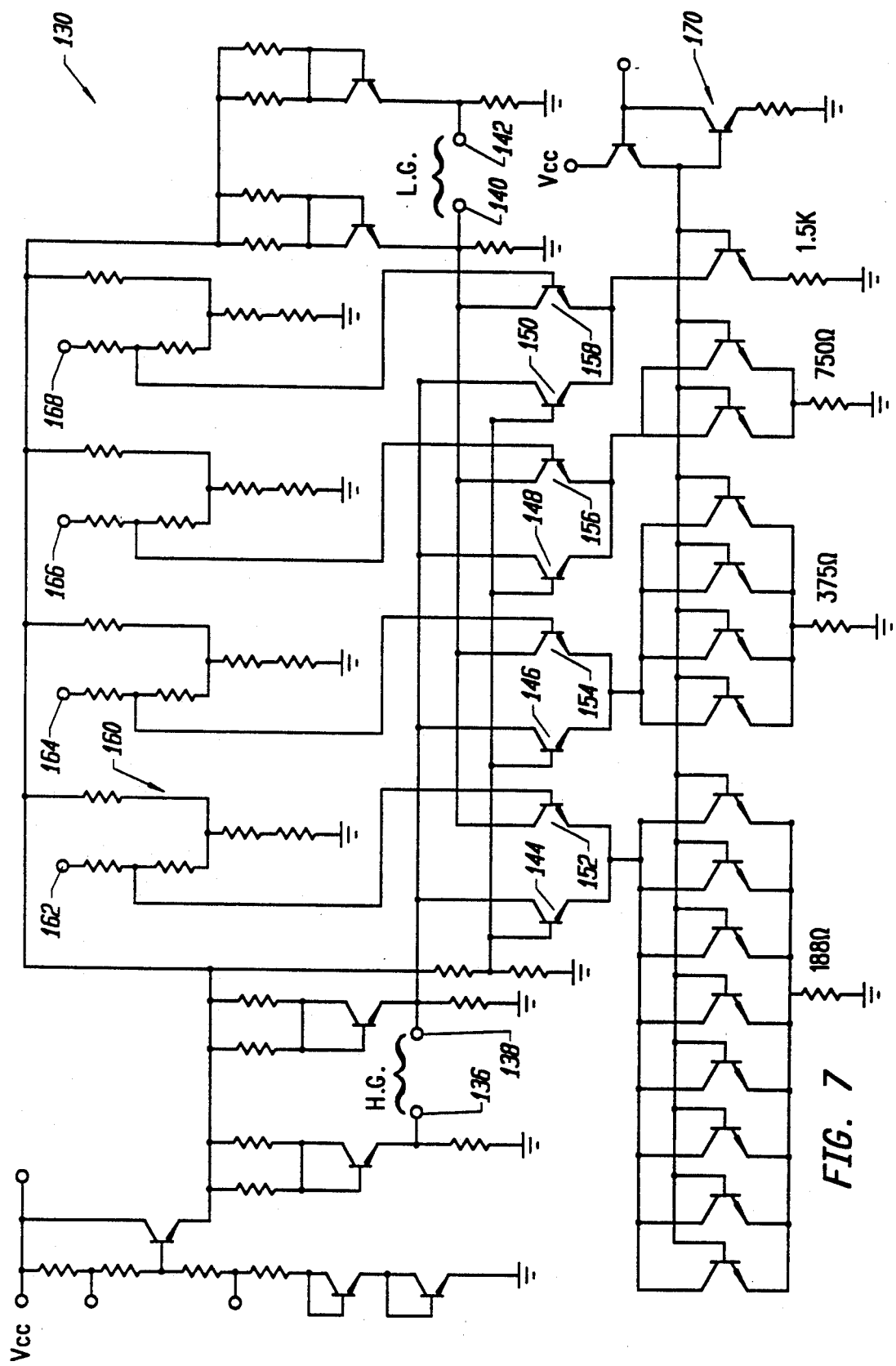
FIG. 7 is a circuit diagram of a digitally-controlled biasing circuit used to set the gains of the high-pass filter channel and of the low-pass filter channel of the slimming circuit according to the invention.

FIG. 7 is a circuit diagram of a digitally settable bias circuit that is used to set the gains of the amplifiers 126,128. As discussed previously, each of the amplifiers includes a second differential stage 174 that is constructed to have two transistor amplifiers in a common base configuration so that the gain of the second stage can be varied by adjusting the relative bias current at the bases of the two transistors. One transistor in the stage has a fixed bias current at terminal 136 and an adjustable bias current at a terminal 138. The same circuit arrangement is used for the second stage of the amplifier 128, with terminals 140 and 142 being provided as the gain control terminals.

As shown in FIG. 7, the bias current at terminal 138 is set by the currents passing through transistors 144–150. The bias currents at terminal 140 are set by the currents through transistors 152–158. The bases of transistors 144–150 are connected to a fixed-bias resistor network. The bases of transistors 152–158 are connected to variable biasing networks, such as, for example, the network 160 so that each pair of transistors 144 and 152, etc., can be differentially biased by digital signals provided at the pads 162–168, as shown in the figure. The loads for these pairs of transistors 144 and 152, etc., are banks of transistors whose conduction characteristics are determined by a fixed biasing network 70. The use of banks of 1,2,4 and 8 transistors in the emitter circuits of the transistor pairs 144 and 152, etc., provides for binary encoding of 16 levels of slimming adjustment.

Figure 8:
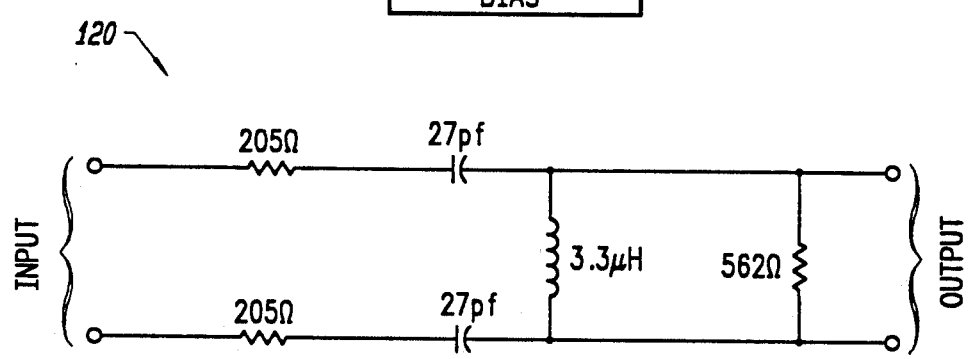
FIG. 8 is a circuit diagram of a balanced high-pass filter.
Figure 9:
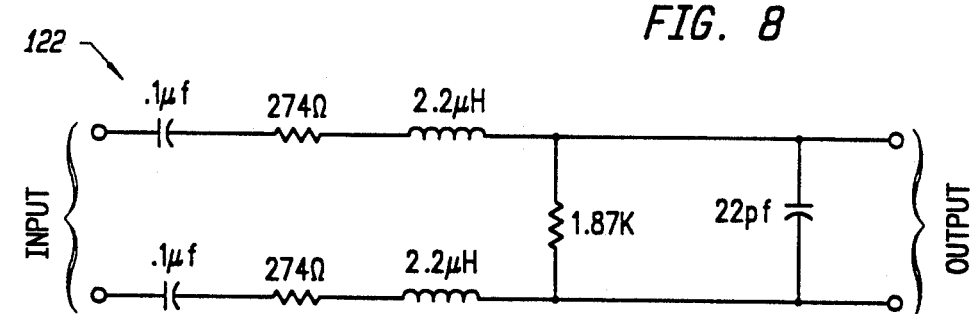
FIG. 9 is a circuit diagram of a balanced low-pass filter.
Figure 10:
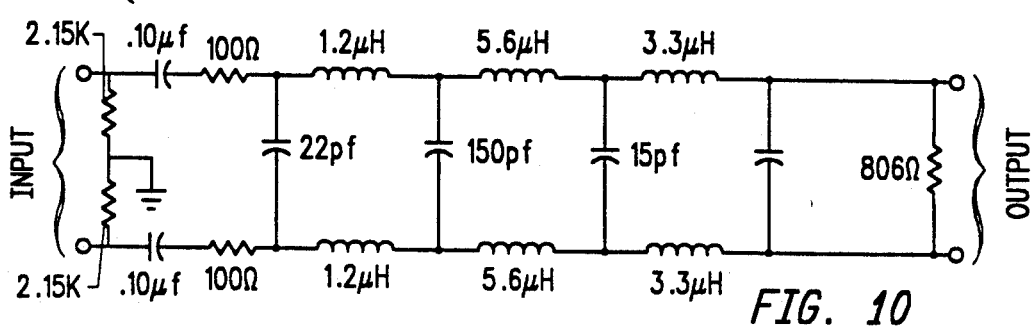
FIG. 10 is a circuit diagram of a balanced, multi-pole, low-pass filter.

FIGS. 8, 9 and 10 illustrate respective specific designs for: the low-pass filters 16,122; the high-pass filters 14,120; and the multipole low 27,134. These filter designs are implemented as conventional, passive-element designs to provide an overall linear-phase response characteristic for the pulse-slimming circuit.

Figure 11:
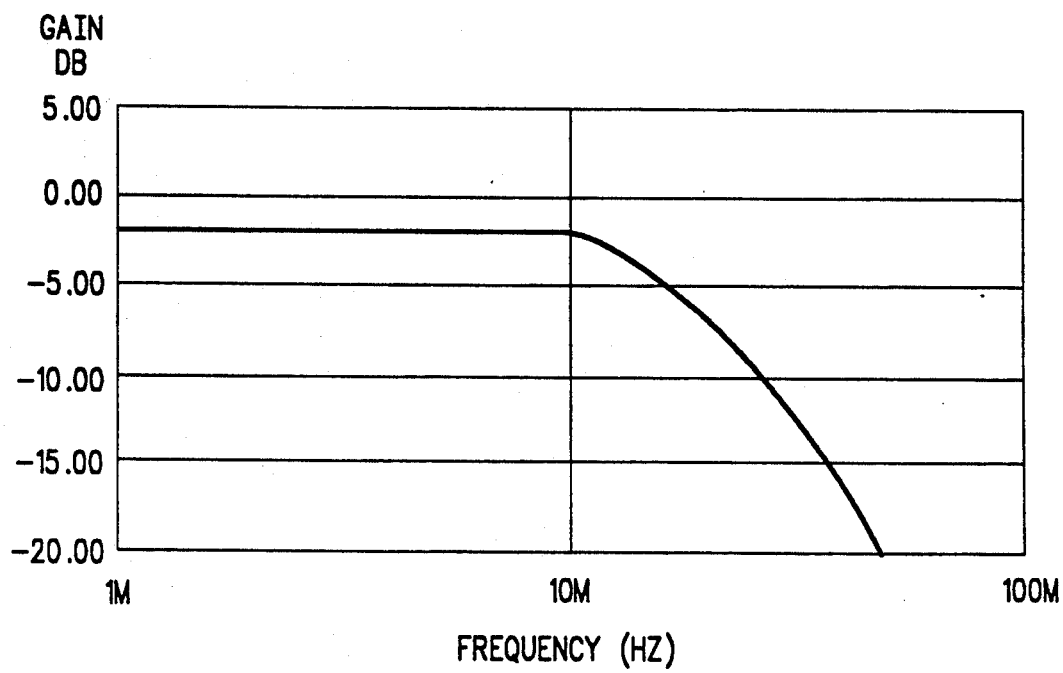
FIG. 11 is a plot of the gain versus frequency characteristic for the low-pass filter of FIG. 8.
Figure 12:
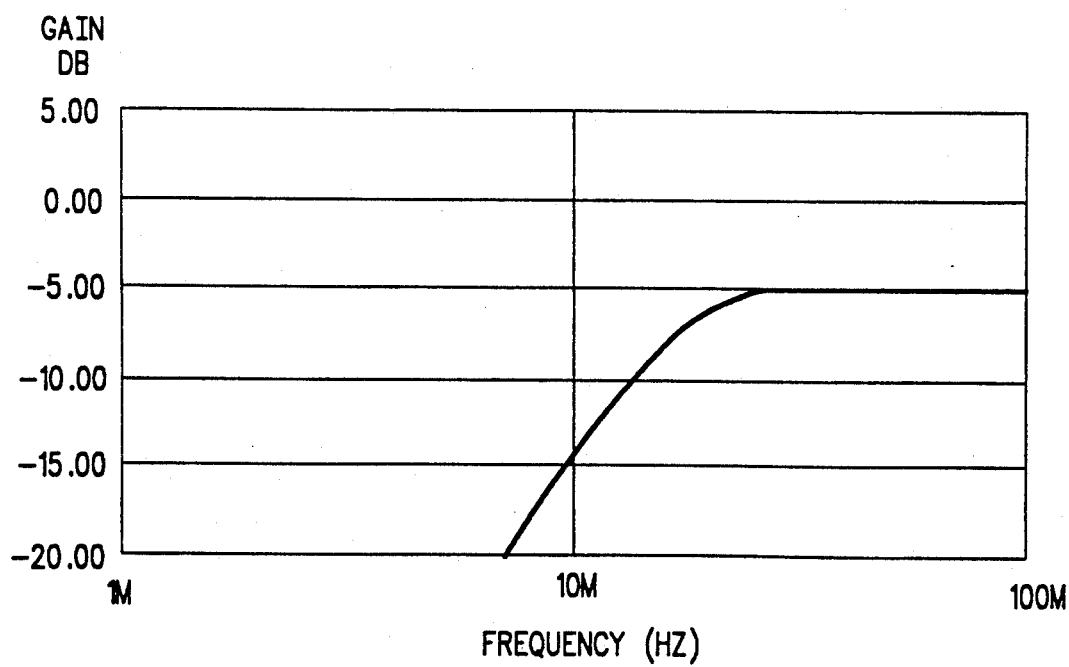
FIG. 12 is a plot of the gain versus frequency characteristic for the high-pass filter of FIG. 9.
Figure 13:
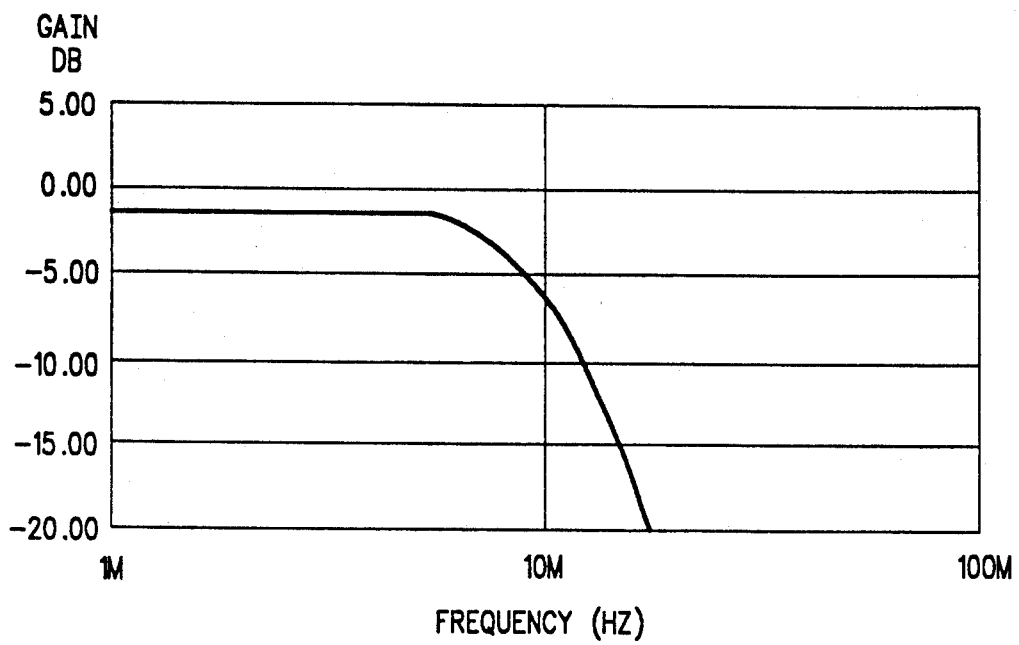
FIG. 13 is a plot of the gain versus frequency characteristic for the multi-pole filter of FIG. 10.

FIGS. 11, 12 and 13 illustrate, respectively, the gain versus frequency response for the filter circuits 8,9, and 10.

Figure 14:
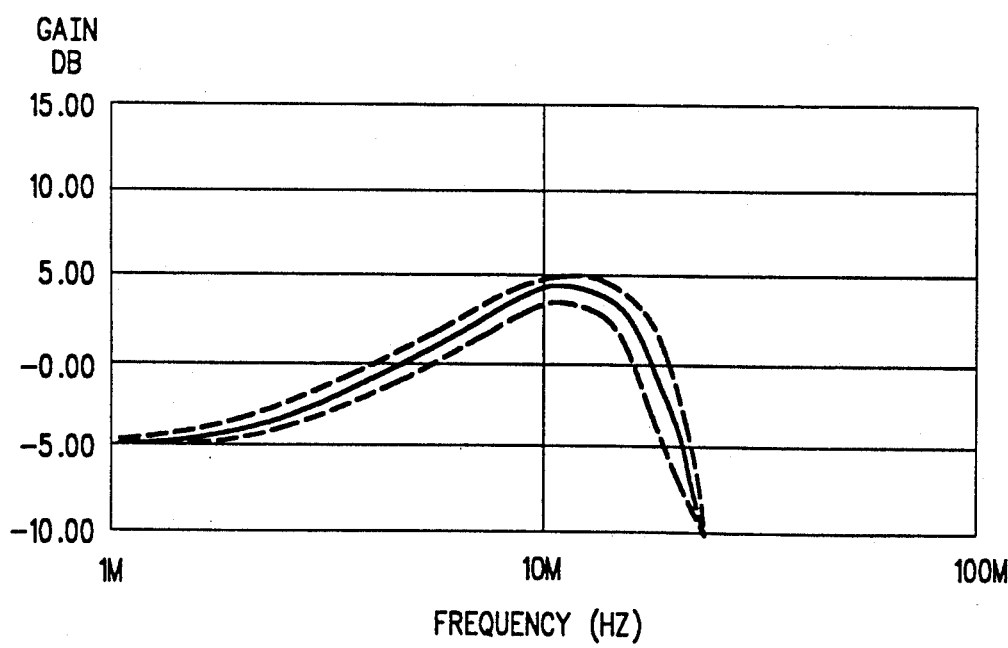
FIG. 14 is a plot of gain versus frequency for the complete slimming circuit of FIG. 2.

FIG. 14 illustrates the overall gain versus frequency response plot for the pulse slimming circuit of FIG. 2 according to the invention. The operation of the circuit has been illustrated by transfer functions for three levels of slimming in FIG. 13. The resultant gain versus frequency response plots are intended to show what is essentially a flat response up to about 1 MHz, an enhanced response above 1 MHz, and rapid decay at about 10 mHz. This general type of response is selected, as described above, by adjusting from the time-domain shape of the pulse delivered from the read/write head and processed through the pulse-slimming circuit. The response characteristic is a compromise between two effects. The width of a pulse peak at half its height is typically 100 nsec. so that the corresponding plot of the pulse in the frequency domain has a half width of the order of a few mHz. The pulse is broadened by enhancement of gain in the vicinity of 10 mHz to yield a slimmer pulse in the time domain. On the other hand, by providing a hard, sharp cutoff at about 10 mHz, high frequency noise in the pulse is suppressed.

Alternative embodiments of slimming circuits are obtained by using different filter responses for the filter functions 120,122 of FIG. 2.

Figure 15:
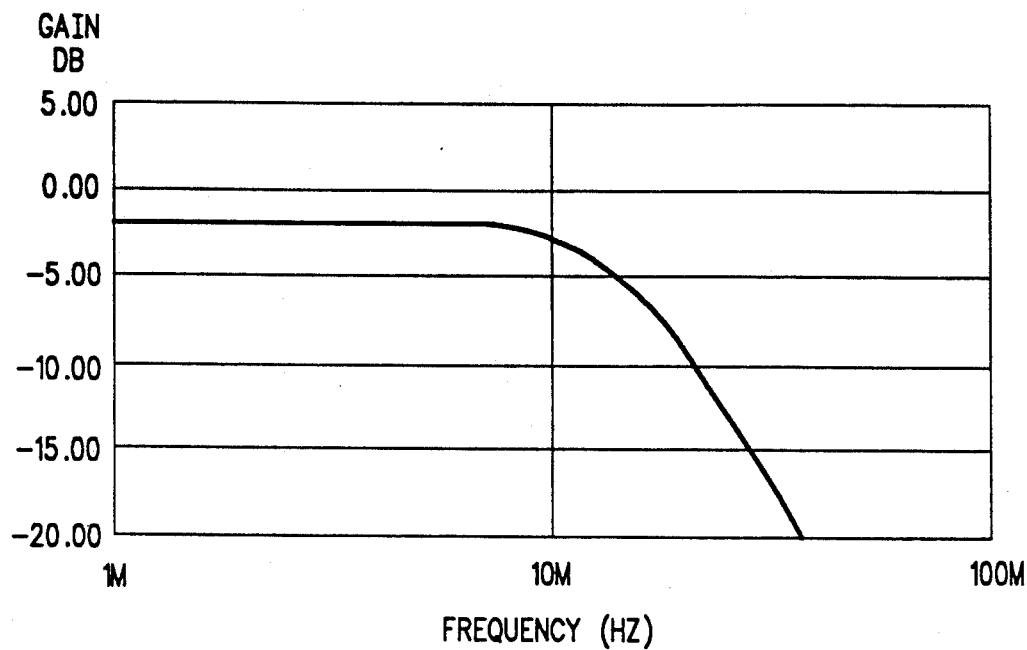
FIG. 15 is a plot of the gain versus frequency plot for a low pass filter.

FIG. 15 shows a plot of a lowpass filter having a frequency response similar to the lowpass filter 122 of FIG. 2 and FIG. 8. This filter is combined in a circuit such as shown in FIG. 2 with a notch-filter in place of the high pass filter 120.

Figure 16:
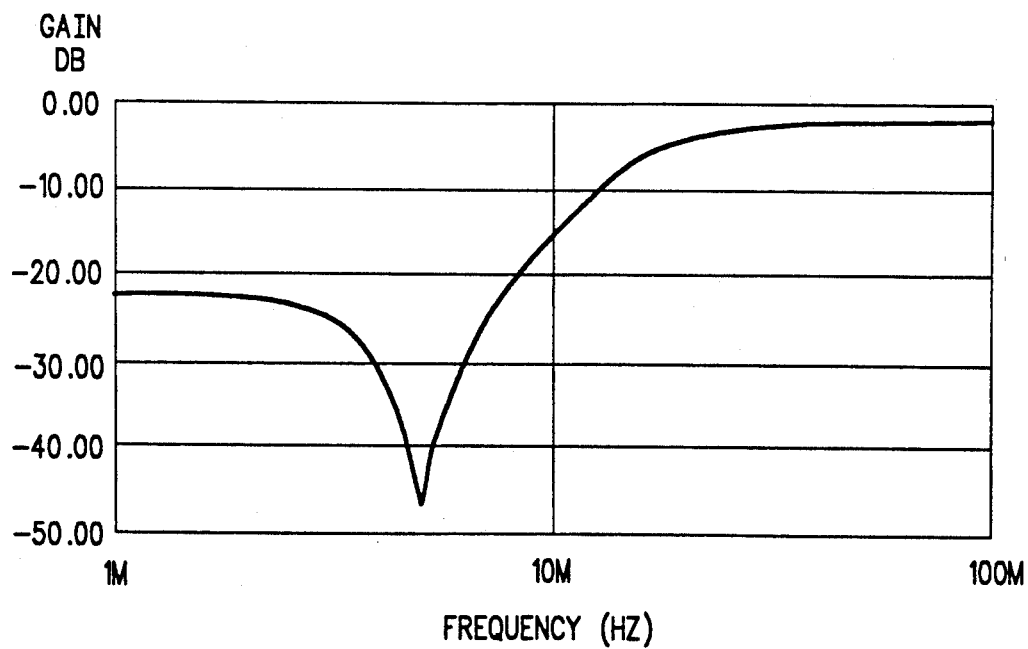
FIG. 16 is a plot of gain versus frequency for a notch filter substitute for the high pass filter of FIG. 2.

FIG. 16 shows the gain versus frequency response of the notch filter. The response obtained from the circuit, which uses the filters described in FIGS. 15 and 16, is similar to the response of FIG. 14. The gains of variable amplifiers 126,128 are set to obtain a desired slimming response.

Looked at another way, the slimming circuit, according to the invention, provides a transfer function for processing the read signal. The slimming, or peaking, is determined by the zeroes of the transfer function. The poles of the transfer function are set to provide a desired phase response and help to determine the low pass cutoff frequency. Subtraction of the signal from the parallel filters provided by the present invention permit pulse slimming for magnetic recording applications.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

We claim:

1. A circuit for slimming signals received from a read/write head of a rotating disk data storage device, comprising:
   a low pass filter connected to the read/write for receiving said signals;
   a high pass filter connected to the read/write head for receiving said signals;
   a first variable gain amplifier connected to the output of the low pass filter;
   a second variable gain amplifier connected to the output of the high pass filter;
   means for selectively adjusting the gain of each of the variable gain amplifiers in accordance with preselected criteria;
   a summing circuit connected to the outputs of the variable gain amplifies to generate a slimmed signal from the amplified components of the signal received from the read/write head; and
   a multi-pole low pass filter having an input port coupled to the summing circuit to receive said slimmed signal from said summing circuit, said multi-pole low pass filter having an output port at which is provided an output signal for said multi-pole low pass filter.

2. A circuit for slimming signals received from a read/write head of a rotating disk data storage device, comprising:
   a low pass filter connected to the read/write head for receiving said signals;
   a high pass filter connected to the read/write for receiving said signals;
   a first variable gain amplifier connected to the output of the low pass filter;
   a second variable gain amplifier connected to the output of the high pass filter;
   means for selectively adjusting the gain of each of the variable gain amplifiers in accordance with preselected criteria; a summing circuit connected to the outputs of the variable gain amplifiers to generate a slimmed signal from the amplified components of the signal received from the read/write head; and
   wherein the signals processed by said circuit are processed as balanced, differential signals.

3. The circuit of claim 2 wherein the variable gain amplifiers and said summing circuit are transistors connected as cascaded common-base transistor amplifiers.

4. The circuit of claim 1 further comprising a differentiator circuit having an input port coupled to the output port of the multi-pole low pass filter, said differentiator circuit having an output port at which is provided a differentiated output signal for the multi-pole low pass filter.

5. A method for slimming read signals received from a read/write head of a rotating disk data storage device comprising the steps of:
   filtering the signal into high and low frequency components, said filtering including providing a notch filter having notch in the pass band of the high frequency components;
   amplifying each component by an amount selected in accordance with a preselected criterion;
   adding the amplifier components to provide a slimmed read signal; and
   low-pass filtering said slimmed read signal.

6. A circuit for slimming read signals received from a read/write head of a rotating disk data storage device, comprising:
   first filter means for receiving and filtering said read signal, said first filter having a predetermined transfer function;
   second filter means for receiving and filtering said read signal, said second filter having a predetermined transfer function;
   first variable-gain amplifier means, connected to the output of said first filter means, for amplifying the output signal from the first filter means;
   second variable-gain amplifier means, connected to the output of said second filter means, for amplifying the output signal from the second filter means;
   means for selectively adjusting the gain of said first and said second variable-gain amplifier means in accordance with preselected criteria;
   summing means, connected to receive output signals from the variable-gain amplifiers, for algebraically summing the output signals of said variable-gain amplifiers and for generating slimmed versions of the read signal from the read/write head; and
   a multi-pole low pass filter having an input port coupled to said summing means to receive said slimmed signal from said summing means, said multi-pole low pass filter having an output port at which is provided an output signal for said multi-pole low pass filter.

7. A circuit for slimming read signals received from a read/write of a rotating disk data storage device, comprising:
   first filter means for receiving and filtering said read signal, said first filter having a predetermined transfer function;
   second filter means for receiving and filtering said read signal, said second filter having a predetermined transfer function;
   first variable-gain amplifier means, connected to the output of said first filter means, for amplifying the output signal from the first filter means;
   second variable-gain amplifier means, connected to the output of said second filter means, for amplifying the output signal from the second filter means;
   means for selectively adjusting the gain of said first and said second variable-gain amplifier means in accordance with preselected criteria;
   summing means, connected to receive output signals from the variable-gain amplifiers, for algebraically summing the output signals of said variable-gain amplifiers and for generating slimmed versions of the read signal from the read/write head; and
   wherein the signals processed by said circuit are processed as balanced, differential signals.

8. The circuit of claim 7 wherein the variable gain amplifiers and said summing circuit are transistors connected as cascaded common-base transistor amplifiers.

9. The circuit of claim 6 further comprising a differentiator circuit having an input port coupled to the output port of the multi-pole low pass filter, said differentiator circuit having an output port at which is provided a differentiated output signal for the multi-pole low pass filter.

10. A circuit for slimming signals received from a read/write head of a rotating disk data storage device, comprising:
    a low pass filter connected to the read/write head for receiving said signals;
    a high pass filter connected to the read/write head for receiving said signals;
    a first variable gain amplifier connected to the output of the low pass filter;
    a second variable gain amplifier connected to the output of the high pass filter;
    means for selectively adjusting the gain of each of the variable gain amplifiers in accordance with preselected criteria;
    a summing circuit connected to the outputs of the variable gain amplifiers to generate a slimmed signal from the amplified components of the signal received from the read/write head; and
    a multi-pole low pass filter having an input port coupled to the summing circuit to receive said slimmed signal from said summing circuit, said multi-pole low pass filter having an output port at which is provided an output signal for said multi-pole low pass filter.

11. The circuit of claim 10 further comprising a differentiator circuit having an input port coupled to the output port of the multi-pole low pass filter, said differentiator circuit having an output port at which is provided a differentiated output signal for the multi-port low pass filter.

12. A circuit for slimming read signals received from a read/write head of a rotating disk data storage device, comprising:
   first filter means for receiving and filtering said read signal, said first filter having a predetermined transfer function;
   second filter means for receiving and filtering said read signal, said second filter having a predetermined transfer function;
   first variable-gain amplifier means, connected to the output of said first filter means, for amplifying the output signal from the first filter means;
   second variable-gain amplifier means, connected to the output of said second filter means, for amplifying the output signal from the second filter means;
   means for selectively adjusting the gain of said first and said second variable-gain amplifier means in accordance with preselected criteria;
   summing means, connected to receive output signals from the variable-gain amplifiers, for algebraically summing the output signals of said variable-gain amplifiers and for generating slimmed versions of the read signal from the read/write head; and
   a multi-pole low pass filter having an input port coupled to the summing circuit to receive said slimmed signal from said summing circuit, said multi-pole low pass filter having an output port at which is provided an output signal for said multi-pole low pass filter.

13. A circuit for slimming read signals received from a red/write head of a rotating disk data storage device, comprising:
   first filter means for receiving and filtering said read signal, said first filter having a predetermined transfer function;
   second filter means for receiving and filtering said read signal, said second filter having a predetermined transfer function;
   first variable-gain amplifier means, connected to the output of said first filter means, for amplifying the output signal from the first filter means;
   second variable-gain amplifier means, connected to the output of said second filter means, for amplifying the output signal from the second filter means;
   means for selectively adjusting the gain of said first and said second variable-gain amplifier means in accordance with preselected criteria;
   summing means, connected to receive output signals from the variable-gain amplifiers, for algebraically summing the output signals of said variable-gain amplifiers and for generating slimmed versions of the read signal from the read/write head; and
   wherein said signals processed by said filter means, said variable-gain amplifier means, said means for adjusting gain, and said summing means, are processed as balanced, differential signals.

14. The circuit of claim 13 wherein said variable gain amplifiers and said summing circuit are transistors connected as cascaded common-base transistor amplifiers.

15. The circuit of claim 12 further comprising a differentiator circuit having an input port coupled to the output port of the multi-pole low pass filter, said differentiator circuit having an output port at which is provided a differentiated output signal for the multi-pole low pass filter.

16. An apparatus for use with a rotating magnetic disc storage device; said apparatus comprising:
   a read/write head, said rear/write head producing an electrical read signal pulse each time a reversal in magnetic flux occurs on said disc as said disc is rotated past said read/write head;
   means for positioning said rear/write head proximate said disc at selected radial locations of said rotating magnetic disc;
   means for slimming said read signals, said means for slimming comprising:
   a low-pass filter, said low-pass filter connected to said read/write head for receiving said signals;
   a high-pass filter, said high-pass filter connected to said read/write head for receiving said signals;
   a first variable gain amplifier having a first amplifier gain connected to the output of said low-pass filter;
   a second variable gain amplifier having a second amplifier gain connected to the output of said high-pass filter;
   means for adjusting the gain of said first variable gain amplifier in response to a first control signal and the gain of said second variable gain amplifier in response to a second control signal; and
   a summing circuit connected to the outputs of said variable gain amplifiers to generate a slimmed signal from said amplified low-pass and high-pass components of said read signal received from said rear/write head;
   means for altering the operation of said means for slimming in cooperation with said means for positioning so that the operation of said means for slimming is adjustable in response to the location of said read/write head proximate said rotating magnetic disc at the time said magnetic recording is read and said read signal is produced;
   said means for altering the operation of said means for slimming comprising:
   means for dividing said magnetic disc into a plurality of identifiable zones of said radial track locations;
   means for determining a zone optimal value for said first gain and a zone optimal value for said second gain for each of said zones so that an optimally slimmed read pulse is generated from each of said read pulse signals read in each of said plurality of zones;
   means for associating said zone optimal first and second gains with said first and second control signals for each of said zones;
   means for storing and retrieving said first and second control signals from a storage;
   means for selectively applying said gain control signals to said means for adjusting gain respective of which of said disc zones said read/write head read to generate said read pulse signal;
   whereby characteristics of said slimmed read signal pulses are zone optimized for all locations on said disc.

17. The apparatus as in claim 16, wherein said means for slimming additionally comprises: a multi-pole low-pass filter having an input port coupled to said summing circuit to receive said slimmed signal from said summing circuit, sand multi-pole low-pass filter having an output port at which is provided an output signal for said multi-pole low pass filter.

18. The apparatus as in claim 16, wherein said means for adjusting said gains of each of said filters is a digitally settable bias circuit.

19. The apparatus as in claim 16, wherein each of said first and second gain control signals comprise a digital number.

20. The apparatus as in claim 19, wherein said digital numbers are supplied by a system microprocessor.

21. The apparatus as in claim 16, wherein said zones are radially concentric regions about the rotary axis of said rotating magnetic disc; and said regions have a plurality of recorded tracks therein.

22. The apparatus as in claim 16, wherein said signals processed by said filters, said variable-gain amplifiers, said means for adjusting gain, and said summing circuit, are processed as balanced, differential signals.

23. The apparatus as in claim 22, wherein said variable gain amplifiers and said summing circuit are transistors connected as cascaded common-base transistor amplifiers.

24. The apparatus as in claim 17, further comprising a differentiator circuit having an input port coupled to the output port of the multi-pole low pass filter, said differentiator circuit having an output port at which is provided a differentiated output signal for the multi-pole low pass filter.

25. A method for processing read signals from a rotating magnetic disc storage device; said processing method comprising the steps of:
dividing said rotating magnetic disc into a plurality of identifiable zones;
positioning a read/write head radially proximate a track within one of said zones of said rotating disc;
generating electrical read signal pulses each time a reversal in magnetic flux occurs on said disc as said disc is rotated past said read/write head;
slimming said read signal respective of said zone from which said signal is generated, said slimming comprising the steps of:
low-pass filtering said read signal;
high-pass filtering said read signal;
predetermining an optimal first gain for said low-pass filtered read signal read from said track within said zone;
predetermining an optimal second gain for said high-pass filtered read signal read from said track within said zone;
amplifying said low-pass filtered signal by said optimal first gain;
amplifying said high-pass filtered signal by said optimal second gain; and
summing said optimally amplified low-pass and high-pass filtered signals to generate a slimmed read signal;
whereby a processed read signal is generated having characteristics improved over said unprocessed read signal.

26. The method of claim 25, wherein said steps of predetermining an optimal first gain and an optimal second gain for said filtered read signal read from said track within said zone comprises the steps of:
positioning said read/write head to a track within said selected zone;
reading a magnetic disc track region having a single magnetic flux reversal to produce a single electrical read signal pulse;
calibration slimming said single pulse read signal using one of a plurality of first and second amplification gain factors for said low-pass and said high-pass filtered signals;
said calibration slimming comprising the steps of:
low-pass filtering said single pulse read signal;
high-pass filtering said single pulse read signal;
amplifying said low-pass filtered signal by one of said plurality of first gain factors;
amplifying said high-pass filtered signal by one of said second gain factors; and
summing said amplified low-pass and high-pass filtered signals to generate a slimmed read signal;
repeating said positioning, said reading, and said calibration slimming for each combination of said plurality of first and second gain factors;
comparing each of said calibration slimmed single pulse read signals against predetermined characteristics;
selecting one of said plurality of possible gain factors for each of said first gain and second gain based on predetermined criteria and associating said selected gain factors with said zone;
storing said zone selected predetermined first and second gain factors for application to said method for processing read signals from tracks within said zone;
whereby optimal amplification gain factors are experimentally predetermined during a calibration phase for application to read signals read during normal disc operation.

27. The method of claim 25, wherein said method additionally comprises the step of: filtering said summed slimmed signal with a multi-pole low-pass filter.

28. An apparatus for use with a rotating magnetic disc storage device; said apparatus comprising:
a read/write head, said read/write head producing an electrical read signal pulse each time a reversal in magnetic flux occurs on said disc as said disc is rotated past said read/write head;
means for positioning said read/write head proximate said disc at selected radial locations of said rotating magnetic disc;
means for slimming said read signals, said means for slimming comprising:
a first means for filtering, said first means for filtering having a predetermined transfer function and connected to said read/write head for receiving said signals;
a second means for filtering, said second means for filtering having a predetermined transfer function and connected to said read/write head for receiving said signals;
a first variable gain amplifier having a first amplifier gain connected to the output of said first means for filtering;
a second variable gain amplifier having a second amplifier gain connected to the output of said second means for filtering;
means for adjusting the gain of said first variable gain amplifier in response to a first control signal and the gain of said second variable gain amplifier in response to a second control signal; and
a summing circuit connected to the outputs of said variable gain amplifiers to generate a slimmed signal from said amplified filtered read signal received from said read/write head;
means for altering the operation of said means for slimming in cooperation with said means for positioning so that the operation of said means for slimming is adjustable in response to the location of said read/write head proximate said rotating magnetic disc at the time said magnetic recording is read and said read signal is produced;

said means for altering the operation of said means for slimming comprising:

means for dividing said magnetic disc into a plurality of identifiable zones of said radial track locations;

means for determining a zone optimal value for said first gain and a zone optimal value for said second gain for each of said zones so that an optimally slimmed read pulse is generated from each of said read pulse signals read in each of said plurality of zones;

means for associating said zone optimal first and second gains with said first and second control signals for each of said zones;

means for storing and retrieving said first and second control signals from a storage;

means for selectively applying said gain control signals to said means for adjusting gain respective of which of said disc zones said read/write head read to generate said read pulse signal;

whereby characteristics of said slimmed read signal pulses are zone optimized for all locations on said disc.

29. The apparatus as in claim 28, wherein said means for slimming additionally comprises: a multi-pole low-pass filter having an input port coupled to said summing circuit to receive said slimmed signal from said summing circuit, said multi-pole low-pass filter having an output port at which is provided an output signal for said multi-pole low pass filter.

30. The apparatus as in claim 28, wherein said means for adjusting said gains of each of said filters is a digitally settable bias circuit.

31. The apparatus as in claim 28, wherein each of said first and second gain control signals comprise a digital number.

32. The apparatus as in claim 31, wherein said digital numbers are supplied by a system microprocessor.

33. The apparatus as in claim 28, wherein said signals processed by said means for filtering, said variable-gain amplifiers, said means for adjusting gain, and said summing circuit, are processed as balanced, differential signals.

34. The apparatus as in claim 33, wherein said variable gain amplifiers and said summing circuit are transistors connected as cascaded common-base transistor amplifiers.

35. The apparatus as in claim 29, further comprising a differentiator circuit having an input port coupled to the output port of the multi-pole low pass filter, said differentiator circuit having an output port at which is provided a differentiated output signal for the multi-pole low pass filter.

36. A method for processing read signals from a rotating magnetic disc storage device; said processing method comprising the steps of:

dividing said rotating magnetic disc into a plurality of identifiable zones;

positioning a read/write head radially proximate a track within one of said zones of said rotating disc;

generating electrical read signal pulses each time a reversal in magnetic flux occurs on said disc as said disc is rotated past said read/write head;

slimming said read signal respective of said zone from which said signal is generated, said slimming comprising the steps of:

filtering said read signal into a first set of frequency components within a first filter bandwidth;

filtering said read signal into a second set of frequency components within a second filter bandwidth;

predetermining an optimal first gain for said first bandwidth filtered read signal read from said track within said zone;

predetermining an optimal second gain for said second bandwidth filtered read signal read from said track within said zone;

amplifying said first bandwidth filtered signal by said optimal first gain;

amplifying said second bandwidth filtered signal by said optimal second gain; and summing said optimally amplified first and second bandwidth filtered signals to generate a slimmed read signal;

whereby a processed read signal is generated having characteristics improved over said unprocessed read signal.

37. The method of claim 33, wherein said steps of predetermining an optimal first gain and an optimal second gain for said filtered read signal read from said track within said zone comprises the steps of:

positioning said read/writ head to a track within said selected zone;

reading a magnetic disc track region having a single magnetic flux reversal to produce a single electrical read signal pulse;

calibration slimming said single pulse read signal using one of a plurality of first and second amplification gain factors for said first bandwidth filtered and said second bandwidth filtered signals;

said calibration slimming comprising the steps of:

filtering said single pulse read signal into a first set of frequency components within a first filter bandwidth;

filtering said single pulse read signal into a second set of frequency components within a second filter bandwidth;

amplifying said first bandwidth filtered signal by one of said plurality of first gain factors;

amplifying said second bandwidth filtered signal by one of said plurality of second gain factors; and summing said optimally amplified first and second bandwidth filtered signals to generate a slimmed read signal;

repeating said positioning, said reading, and said calibration slimming for each combination of said plurality of first and second gain factors;

evaluating each of said calibration slimmed single pulse read signals against predetermined characteristics;

selecting one of said plurality of possible gain factors for each of said first gain and second gain based on predetermined criteria and associating said selected gain factors with said zone;

storing said zone selected predetermined first and second gain factors for application to said method for processing read signals from tracks within said zone;

whereby optimal amplification gain factors are experimentally predetermined during a calibration phase for application to read signals read during normal disc operation.

38. The method of claim 33, wherein said method additionally comprises the step of: filtering said summed slimmed signal with a multi-pole low-pass filter.

* * * * *